(12) United States Patent
Kim et al.

(10) Patent No.: US 10,108,391 B2
(45) Date of Patent: Oct. 23, 2018

(54) AUDIO DATA OPERATING METHOD AND ELECTRONIC DEVICE SUPPORTING THE SAME

(71) Applicant: Samsung Electronics Co., Ltd., Gyeonggi-do (KR)

(72) Inventors: Bong Jun Kim, Gyeonggi-do (KR); Se Hoon Kim, Jeollanam-do (KR)

(73) Assignee: Samsung Electronics Co., Ltd (KR)

( * ) Notice: Subject to any disclaimer, the term of this patent is extended or adjusted under 35 U.S.C. 154(b) by 190 days.

(21) Appl. No.: 14/857,328

(22) Filed: Sep. 17, 2015

(65) Prior Publication Data

US 2016/0077790 A1    Mar. 17, 2016

(30) Foreign Application Priority Data

Sep. 17, 2014   (KR) .................. 10-2014-0123349

(51) Int. Cl.
*G06F 17/00* (2006.01)
*G06F 3/16* (2006.01)
*G11B 20/10* (2006.01)
*G11B 27/10* (2006.01)
*G06F 17/30* (2006.01)

(52) U.S. Cl.
CPC .......... *G06F 3/165* (2013.01); *G06F 17/3074* (2013.01); *G11B 20/10527* (2013.01); *G11B 27/10* (2013.01)

(58) Field of Classification Search
CPC .... G11B 2020/10787; G11B 20/10527; G11B 27/10; G11B 2020/10768; G11B 2020/1062; G06F 3/165; G06F 3/16; G10L 19/167
See application file for complete search history.

(56) References Cited

U.S. PATENT DOCUMENTS

| | | | |
|---|---|---|---|
| 7,117,365 B1 | 10/2006 | Rump et al. | |
| 7,124,444 B2 | 10/2006 | Yan | |
| 2002/0154775 A1 | 10/2002 | Yang | |
| 2007/0116435 A1* | 5/2007 | Kim ...................... G10L 19/167 | 386/241 |
| 2010/0088330 A1* | 4/2010 | Komiya ........... G11B 20/00007 | 707/758 |
| 2012/0165965 A1* | 6/2012 | Robinson ................ G11B 27/11 | 700/94 |

\* cited by examiner

*Primary Examiner* — Fan Tsang
*Assistant Examiner* — David Siegel
(74) *Attorney, Agent, or Firm* — The Farrell Law Firm, P.C.

(57) ABSTRACT

Methods and apparatuses of operating audio data of an electronic device are provided. A storage space is generated where decoded audio data is stored. Frames are stored in the storage space. The frames have a playable unit length that corresponds to a full length that is formed when encoded audio data is decoded. The encoded audio data is decoded from a requested playback point and the decoded audio data is stored in the storage space, upon detecting a request for playback of audio data at the requested playback point. The decoded audio data is output.

20 Claims, 12 Drawing Sheets

AUDIO DATA OPERATING METHOD AND ELECTRONIC DEVICE SUPPORTING THE SAME

PRIORITY

This application claims priority under 35 U.S.C. § 119(a) to a Korean patent application filed on Sep. 17, 2014 in the Korean Intellectual Property Office and assigned Ser. No. 10-2014-0123349, the content of which is incorporated herein by reference.

BACKGROUND

1. Field of the Disclosure

The present disclosure relates generally to functions of an electronic device, and more particularly, to an audio data operating function of an electronic device.

2. Description of the Related Art

In general, existing electronic devices support functions for operating audio data. For example, existing electronic devices may play audio data that is collected through a streaming service or a download service. These devices may encode audio data at the request of service providers and content providers, and may store or play the encoded audio data.

Accordingly, as described above, existing electronic devices may decode the encoded audio data in order to play the encoded audio data. Additionally, in order for an electronic device to play audio data from a specific point, all of the encoded audio data is decoded, causing electronic devices to wait the time required to decode all of the encoded audio data. Alternatively, electronic devices may play encoded audio data upon removal of data from the start point to a specific point of the encoded audio data, and encoded audio data that is included in a removed area is not played by the electronic device.

SUMMARY

The present disclosure has been made to address at least the above problems and/or disadvantages and to provide at least the advantages described below. Accordingly, an aspect of the present disclosure provides a method of decoding encoded audio data for playing a specific point of the encoded audio data in relation to an operating method of audio data and an electronic device supporting the same.

In accordance with an aspect of the present disclosure, an electronic device is provided that includes an audio data processing module configured to generate a storage space where decoded audio data is stored, store frames in the storage space, the frames having a playable unit length that corresponds to a full length that is formed when encoded audio data is decoded, and, upon detecting a request for playback of audio data at a requested playback point, decode the encoded audio data from the requested playback point and store the decoded audio data in the storage space. The electronic device also includes an output device configured to output the decoded audio data.

In accordance with another aspect of the present disclosure, an audio data operating method of an electronic device is provided. A storage space is generated where decoded audio data is stored. Frames are stored in the storage space. The frames have a playable unit length that corresponds to a full length that is formed when encoded audio data is decoded. The encoded audio data is decoded from a requested playback point and the decoded audio data is stored in the storage space, upon detecting a request for playback of audio data at the requested playback point. The decoded audio data is output.

In accordance with another aspect of the present disclosure, a non-transitory computer readable medium is provided with computer executable instructions stored thereon executed by a processor to perform an audio data operating method of an electronic device. The method includes generating a storage space where decoded audio data is stored, and storing frames in the storage space. The frames have a playable unit length that corresponds to a full length that is formed when encoded audio data is decoded. The method also includes decoding the encoded audio data from a requested playback point and storing the decoded audio data in the storage space, upon detecting a request for playback of audio data at the requested playback point, and outputting the decoded audio data.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
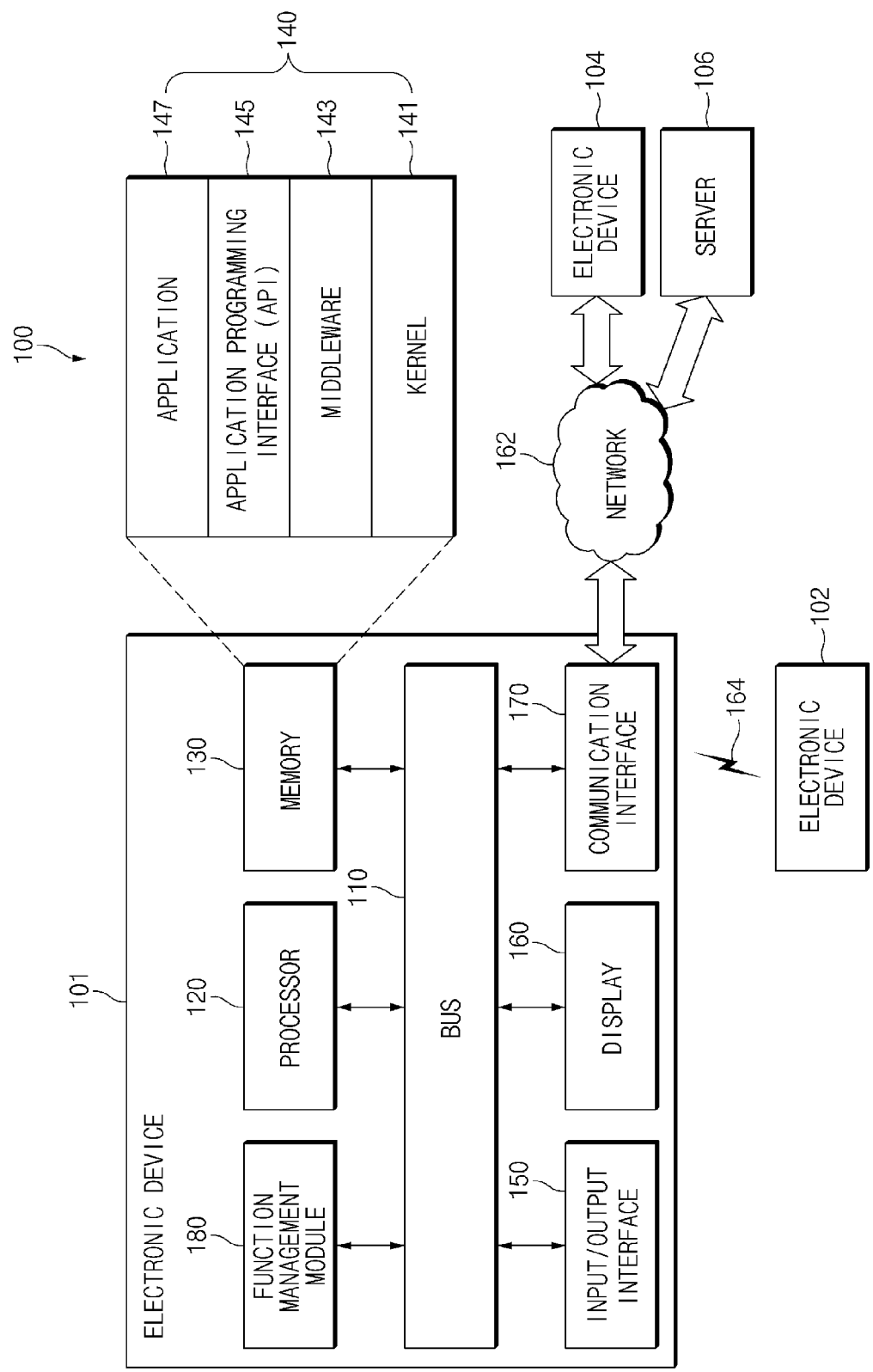
FIG. 1 is a diagram illustrating an electronic device in a network environment, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "include," "comprise," "have", "may include," "may comprise", and "may have", as used herein, indicate functions, operations, or the existence of elements, but do not exclude other functions, operations, or elements.

For example, the expression "A or B", or "at least one of A and B" may indicate the inclusion of A, B, or both A and B. Further, the expression "A or B", or "at least one of A and B" may indicate (1) at least one A, (2) at least one B, or (3) both at least one A and at least one B.

Terms such as "1st", "2nd", "first", "second", and the like, as used herein, may modify various elements of various embodiments of the present disclosure, but do not limit the elements. For example, "a first user device" and "a second user device" may indicate different user devices regardless of the order or the importance. For example, a first component may be referred to as a second component, and vice versa, without departing from the scope of the present disclosure.

In various embodiments of the present disclosure, it will be understood that when a component (for example, a first component) is referred to as being "(operatively or communicatively) coupled with/to", "connected to", or "accessed by" another component (for example, a second component), the component may be directly connected to the other component or connected through another component (for example, a third component). In various embodiments of the present disclosure, it will be understood that when a component (for example, the first component) is referred to as being "(operatively or communicatively) directly coupled with/to", "directly connected to", or "directly accessed by" another component (for example, the second component), another component (for example, the third component) does not exist between the component (for example, the first component) and the other component (for example, the second component).

The expression "configured to", as used herein, may be interchangeably used with "suitable for", "having the capacity to", "designed to", "adapted to", "made to", or "capable of", according to the situation, for example. The term "configured to" may not necessarily mean "specifically designed to" in terms of hardware. Instead, the expression "a device configured to", in some situations, may mean that the device and another device or part are "capable of". For example, the phrase "a processor configured to perform A, B, and C" may mean a dedicated processor (for example, an embedded processor) for performing a corresponding operation, or a generic-purpose processor (for example, a central processing unit (CPU) or application processor) for performing corresponding operations, by executing at least one software program stored in a memory device.

Terms are used in various embodiments of the present disclosure to describe specific embodiments of the present disclosure, and are not intended to limit the scope of other embodiments. The terms used in singular form may include plural forms as well, unless they have a clearly different meaning in the context. Unless otherwise indicated herein, all terms used herein, which include technical or scientific terms, may have the same meaning that is generally understood by a person skilled in the art. In general, terms defined in a dictionary should be considered to have the same meaning as the contextual meaning of the related art, and, unless clearly defined herein, should not be understood abnormally or as having an excessively formal meaning. Further, even the terms defined herein cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation servers, personal digital assistants (PDAs), portable multimedia players (PMPs), MP3 players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliance. The smart home appliance may include at least one of, for example, a television, digital versatile disc (DVD) player, an audio player, a refrigerator, an air conditioner, a cleaner, an oven, a microwave oven, a washing machine, an air cleaner, a set-top box, a home automation control panel, a security control panel, a TV box, a game console, an electronic dictionary, an electronic key, a camcorder, and an electronic picture frame.

According to some embodiments of the present disclosure, an electronic device may include at least one of a medical device supporting a call forwarding service (for example, a portable measurement device (for example, a glucometer, a heart rate meter, a blood pressure meter, a temperature meter, etc.), a magnetic resonance angiography (MRA) device, a magnetic resonance imaging (MRI) device, a computed tomography (CT) device, a medical imaging device, an ultrasonic device, etc.), a navigation device, a global positioning system (GPS) receiver, an event data recorder (EDR), a flight data recorder (FDR), a vehicle infotainment device, marine electronic equipment (for example, a marine navigation system, a gyro compass, etc.), avionics, security equipment, a vehicle head unit, an industrial or household robot, a financial institution's automatic teller machine (ATMs), a store's point of sales (POS), or interne of things (IoT) (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of a part of furniture or buildings/structures supporting a call forwarding service, an electronic board, an electronic signature receiving device, a projector, and various measuring instruments (for example, water, electricity, gas, or radio signal measuring instruments).

An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices, and may include a new kind of an electronic device according to developments in technology.

The term "user", as used herein, may refer to a person using an electronic device or a device using an electronic device (for example, an artificial intelligent electronic device).

FIG. 1 is a diagram illustrating an electronic device in a network environment, according to an embodiment of the present disclosure.

Referring to FIG. 1, an electronic device 101 in a network environment 100 is described according to various embodiments of the present disclosure. The electronic device 101 includes a bus 110, a processor 120, a memory 130, an input/output interface 150, a display 160, a communication interface 170, and a function management module 180. According to an embodiment of the present disclosure, the electronic device 101 may omit at least one of the components or may include at least one additional component.

According to an embodiment of the present disclosure, the electronic device 101s may process audio data. For example, the electronic device 101 may collect audio data through a streaming service or a download service. Additionally, the electronic device 101 may play, store, or process the collected audio data. According to an embodiment of the present disclosure, the electronic device 101 may collect specified audio data from a server device providing streaming radio, and play the collected audio data. The electronic device 101 may sequentially or continuously collect and play audio data from a corresponding station based on a selection of the station classified by a service/content provider providing streaming radio, for example, a theme obtained by binding each genre, each artist, each recent song, or each subject. Additionally, the electronic device 101 may encode and store the collected audio data and may decode and play the encoded audio data.

According to various embodiments of the present disclosure, the electronic device 101 may collect audio data from a server device providing a download service, and play the collected audio data. The electronic device 101 may collect audio data from the server device, and may encode and store the audio data according to a request from a service/content provider that provides the download service. The electronic device 101 may decode and play the encoded audio data.

The bus 110, for example, may include a circuit for connecting the components 120 to 180 to each other, and for delivering a communication (for example, control message and/or data) between the components 120 to 180. According to an embodiment of the present disclosure, the bus 110 may deliver audio data received through the communication interface 170 to at least one of the processor 120 and the function management module 180.

According to various embodiments of the present disclosure, the bus 110 may deliver data processed in the function management module 180 to the memory 130, the input/output interface 150, or the display 160. For example, the bus 110 may deliver data processed in the function management module 180 to the input/output interface 150.

The processor 120 may include at least one of a CPU, an application processor (AP), and a communication processor (CP). Additionally, the processor 120 may include the function management module 180, or may be separate from the function management module 180 with direction communication through the bus 110. The processor 120, for example, may execute a calculation or may process data for control of and/or communication with at least one another component of the electronic device 101.

According to various embodiments of the present disclosure, the processor 120 may support data processing relating to the function management module 180. For example, the processor 120 may execute a calculation or process data for control of and/or communication with the memory 130 or the function management module 180 in order to process audio data.

The memory 130 may include volatile and/or nonvolatile memory. The memory 130, for example, may store instructions or data relating to at least one other component of the electronic device 101. According to an embodiment of the present disclosure, the memory 130 stores software and/or a program 140. The program 140 includes a kernel 141, middleware 143, an application programming interface (API) 145, and an application program (or an application) 147. At least part of the kernel 141, the middleware 143, or the API 145 may be referred to as an operating system (OS).

The kernel 141, for example, may control or manage system resources (for example, the bus 110, the processor 120, the memory 130, etc.) used for performing operations or functions implemented in other programs (for example, the middleware 143, the API 145, or the application program 147). Additionally, the kernel 141 may provide an interface for controlling or managing system resources by accessing an individual component of the electronic device 101 from the middleware 143, the API 145, or the application program 147.

The middleware 143, for example, may serve an intermediary role for exchanging data as the API 145 or the application program 147 communicates with the kernel 141.

Additionally, the middleware 143 may process at least one job request received from the application program 147 according to a priority. For example, the middleware 143 may assign to at least one application program 147 a priority for using a system resource (for example, the bus 110, the processor 120, or the memory 130) of the electronic device 101. Further, the middleware 143 may perform scheduling or load balancing for the at least one job request by processing the at least one job request according to the priority assigned to the at least one job request.

The API 145 is an interface for allowing the application program 147 to control a function provided from the kernel 141 or the middleware 143, and may include at least one interface or function (for example, an instruction) for file control, window control, image processing, or character control.

According to various embodiments of the present disclosure, the memory 130 may store audio data. For example, the memory 130 may store encoded audio data processed in the function management module 180. Further, the memory 130 may store information (for example, metadata) relating to audio data processed in the function management module 180. The audio data related information may include the genre, tack name, artist name, codec type, bit rate, album artwork, description, or prefetch data of audio data. The prefetch data may include a predetermined section where audio data is not encoded. For example, the prefetch data is data for playback time reduction in relation to streaming radio, and may include data from a start time to a predetermined time of specified audio data.

The input/output interface 150, for example, may serve as an interface for delivering instructions or data, inputted from a user or another external device, to another component(s) of the electronic device 101. Additionally, the input/output interface 150 may output instructions or data, received from another component(s) of the electronic device 101, to a user or another external device.

According to various embodiments of the present disclosure, the input/output interface 150 may deliver instructions or data, inputted from a user or an external device, to at least one of the processor 120 and the function management module 180. According to various embodiments of the present disclosure, the input/output interface 150 may include an output device, such as a speaker or an earphone, and may control the output of audio data processed in the function management module 180.

The display 160, for example, may include a liquid crystal display (LCD), a light emitting diode (LED) display, an organic light emitting diode (OLED) display, a microelectromechanical systems (MEMS) display, or an electronic paper display. The display 160 may display various content (for example, text, image, video, icon, symbol, etc.) to a user. The display 160 may include a touch screen, and for example, may receive a touch, gesture, proximity, or hovering input, by using an electronic pen or a user's body part.

According to various embodiments of the present disclosure, the display 160 may display track information. For example, the display 160 may display the song title, artist name, or album art of audio data.

The communication interface 170, for example, may establish communication between the electronic device 101 and an external device (for example, a first external electronic device 102, a second external electronic device 104, or a server 106). For example, the communication interface 170 may communicate with the second external electronic device 104 or the server 106 through a network 162 via wireless communication or wired communication.

The wireless communication may use at least one of long term evolution (LTE), LTE-advanced (LTE-A), code division multiple access (CDMA), wideband CDMA (WCDMA), universal mobile telecommunications service (UMTS), wireless broadband (WiBro), or global systems for mobile communications (GSM) as a cellular communication protocol, for example. Additionally, the wireless communication, for example, may include short-range communication 164. The short range communication 164, for example, may include at least one of wireless fidelity (WiFi), Bluetooth (BT), near field communication (NFC), GPS, etc. The wired communication, for example, may include at least one of universal serial bus (USB), high definition multimedia interface (HDMI), recommended standard 232 (RS-232), plain old telephone service (POTS), etc. The network 162 may include a telecommunications network, for example, at least one of a computer network (for example, local area network (LAN) or wide area network (WAN)), internet, and a telephone network.

Each of the first and second external electronic devices 102 and 104 may be of the same type or a different type than that of the electronic device 101. According to an embodiment of the present disclosure, the server 106 may include a group of one or more servers. According to an embodiment of the present disclosure, all or a part of the operations executed on the electronic device 101 may be executed on one or more other electronic devices (for example, the first external electronic device 102, the second external electronic device 104, and/or the server 106). According to an embodiment of the present disclosure, when the electronic device 101 performs a certain function or service automatically or by a request, it may request at least part of a function relating thereto from another device (for example, the first external electronic device 102, the second external electronic device 104, or the server 106) instead of or in addition to executing the function or service by itself. The other electronic device (for example, the first external electronic device 102, the second external electronic device 104, or the server 106) may execute a requested function or an additional function, and may deliver an execution result to the electronic device 101. The electronic device 101 may provide the requested function or service as is, or by performing additional processing on the received result. For example, cloud computing, distributed computing, or client-server computing technology may be used.

According to various embodiments of the present disclosure, the communication interface 170 may communicate with the second external electronic device 104 or the server 106 through the network 162 via wireless communication or wired communication. For example, the communication interface 170 may receive audio data through the server 106 connected to the network 162.

The function management module 180 may perform a function of collecting and processing audio data according to instructions inputted from a user or scheduled data, which are delivered from the input/output interface 150. For example, the function management module 180 may receive a player execution event, an audio data playback start event, or an audio data designation change event. According to various embodiments of the present disclosure, the function management module 180 may be included in the processor 120 or may be provided as an additional separate module.

According to various embodiments of the present disclosure, the function management module 180 may manage the collection and storing of audio data or audio data related information from the server 106 connected through the communication interface 170. According to an embodiment of the present disclosure, the function management module 180 may manage the collection and storing of station information or audio data related information included in a station from the server providing streaming radio.

According to various embodiments of the present disclosure, the function management module 180 may process audio data. According to an embodiment of the present disclosure, the function management module 180 may encode or decode audio data. For example, when audio data is collected from the server 106 according to a request of a service/content provider, and an amount of the audio data is greater than a predetermined size (for example, a data size of about 30 sec), the function management module 180 may encode and store the collected audio data. Additionally, the function management module 180 may decode the encoded audio data when the playback of audio data is requested.

According to an embodiment of the present disclosure, the function management module 180 may control an audio data related information display. According to an embodiment of the present disclosure, the function management module 180 may control the display of the song title, artist name, or album art of specified audio data.

According to various embodiments of the present disclosure, the function management module 180 may control audio data output. According to an embodiment of the present disclosure, the function management module 180 may control the output of audio data collected from the server 106, which provides streaming radio. Additionally, the function management module 180 may control the decoding and output of the encoded audio data.

According to various embodiments of the present disclosure, the function management module 180 may control audio data transmission or control the transmission of an audio data related control signal. According to an embodiment of the present disclosure, the function management module 180 may control the transmission of audio data to an external electronic device or the transmission of audio data related control signals when an external electronic device (for example, the first external electronic device 102) operates in a companion mode. The audio data related control signal may include a signal relating to playback, pause, stop, or item designation change of audio data.

Figure 2:
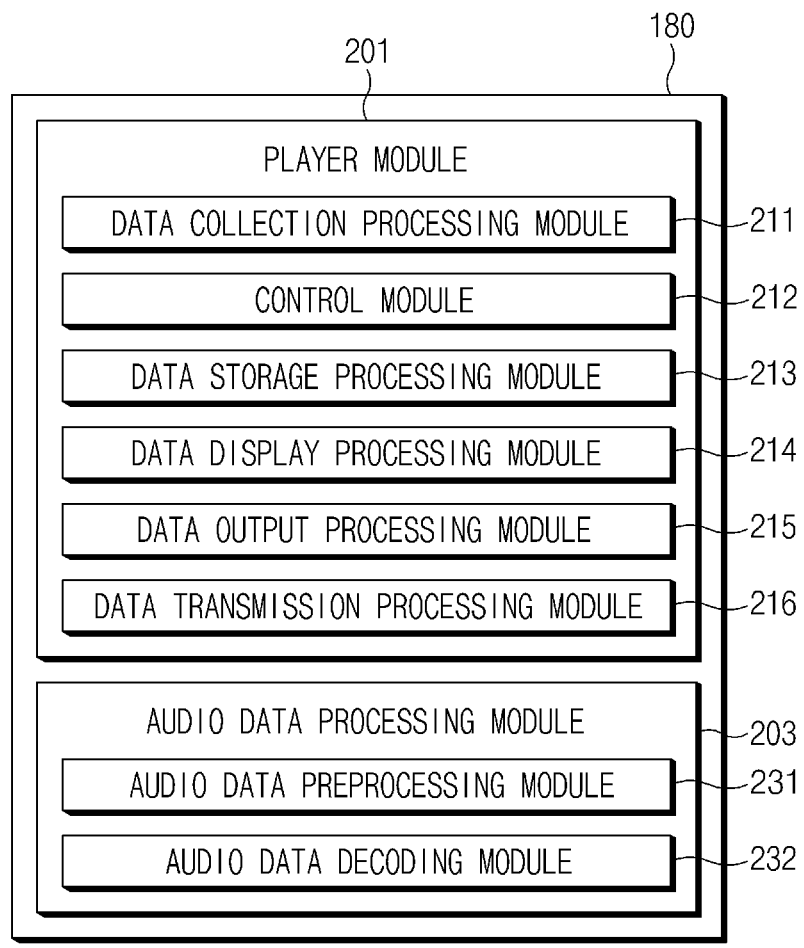
FIG. 2 is a diagram illustrating a function management module, according to an embodiment of the present disclosure.

FIG. 2 is a diagram illustrating a function management module, according to an embodiment of the present disclosure.

Referring to FIG. 2, the function management module 180 includes a player module 201 and an audio data processing module 203. The player module 201 manages a function relating to an audio data player provided from an application 147. The player module 201 includes a data collection processing module 211, a control module 212, a data storage processing module 213, a data display processing module 214, a data output processing module 215, and a data transmission processing module 216. The audio data processing module 203 manages a function for processing audio data, and includes an audio data preprocessing module 231 and an audio data decoding module 232. According to an embodiment of the present disclosure, the player module 201 may be included in the audio data processing module 203 or may be provided as a separate module.

The data collection processing module 211 collects audio data or audio data related information. According to an embodiment of the present disclosure, the data collection processing module 211 may collect station information, audio data related information included in a station, or specified audio data from a specific server (for example, the server 106) providing streaming radio. For example, the data collection processing module 211 may collect station information to be updated or audio data related information included in a station from the server 106 based on an execution event of an audio data player (for example, a streaming radio player) provided from the application 147. Alternatively, the data collection processing module 211 may collect specified audio data based on an audio data playback start event.

The control module 212 may execute operations or data processing for control of and/or communication with components of the player module 201. According to various embodiments of the present disclosure, the control module 212 may process an input event for audio data.

According to various embodiments of the present disclosure, the control module 212 may control communication with the server 106 based on a player execution request.

According to various embodiments of the present disclosure, the control module 212 may generate an output buffer where audio data to be outputted is stored based on an audio data playback start request. The control module 212 may buffer collected audio data in order to output audio data collected from the server 106 providing streaming radio. Additionally, the control module 212 may buffer decoded audio data in order to output the decoded audio data based on the decoding of the encoded audio data.

According to various embodiments of the present disclosure, when an amount of audio data collected from the server 106 is greater than or equal to a predetermined size, the control module 212 may encode audio data based on an audio data designation change request. The control module 212 may perform processing to encode audio data through an encoding function application included in the electronic device 101 based on the codec type of the audio data.

The data storage processing module 213 stores audio data or audio data related information. According to an embodiment of the present disclosure, the data storage processing module 213 may perform processing to store station information collected from the server 106 or audio data related information included in a station. For example, the data storage processing module 213 may store the genre, song title, artist name, codec type, bit rate, album art, description, or prefetch data of the audio data.

According to various embodiments of the present disclosure, the data storage processing module 213 may store encoded audio data. According to an embodiment of the present disclosure, the data storage processing module 213 may store encoded and processed audio data in the memory 130 through the control module 212 based on an audio data designation change request. Additionally, the data storage processing module 213 may store preview data relating to the encoded audio data. For example, the data storage processing module 213 may store a predetermined range of un-encoded audio data including at least part of a point temporally before or after the last playback point or a reference point based on the last playback point.

The data display processing module 214 displays audio data related information. According to an embodiment of the present disclosure, the data display processing module 214 may display audio data related information of a specified item in relation to a streaming radio player. For example, the data display processing module 214 may display the song title, artist name, or album art of audio data of a specified item based on an input event for the audio data (for example, audio data designation change event).

The data output processing module 215 outputs audio data. According to an embodiment of the present disclosure, the data output processing module 215 may output audio data collected from the server 106. Additionally, the data output processing module 215 may decode and output the stored encoded audio. For example, the data output processing module 215 may output audio data stored in the output buffer through the input/output interface 150.

The data transmission processing module 216 may transmit audio data or an audio data related control signal. According to an embodiment of the present disclosure, the data transmission processing module 216 may transmit audio data or an audio data related control signal to an external electronic device (for example, the first external electronic device 102) connected to the electronic device 101 when operating in a companion mode. For example, when the electronic device 101 operates as a host device and the first external electronic device 102 operates as a wearable device in a companion mode, the electronic device 101 may transmit audio data or an audio data related control signal to the electronic device 102. Additionally, the electronic device 102 may transmit audio data related control signal to the electronic device 101. In this case, the data transmission processing module 216 may transmit audio data or an audio data related control signal through an application (for example, a gear application) for performing communication and a control function between a host device included in the electronic device and the wearable device.

The audio data preprocessing module 231 performs a preprocessing function on audio data. According to an embodiment of the present disclosure, the audio data preprocessing module 231 may perform a preprocessing function in relation to the decoding of encoded audio data. For example, the audio data preprocessing module 231 may generate a buffer (for example, a reference buffer) corresponding to a full length formed when encoded audio data is decoded based on audio data related information. For example, the audio data preprocessing module 231 may generate a reference buffer corresponding to the full length of data to be decoded by using information such as, for example, a bit rate or a full length, among audio data related information.

The audio data preprocessing module 231 may repeatedly store a specified frame, for example, a dummy frame, in a reference buffer generated based on audio data related information in order to correspond to the full length. The dummy frame, as a unit of data generated using the format or codec type of audio data, may be one kind of model frame generated to be played by an audio data player. By filling the reference buffer with dummy frames, even when an audio data player selects an arbitrary point of encoded audio data as a start point, and plays the audio data, the audio data preprocessing module 231 may perform processing to play the audio data without a playback time delay or re-decoding. For example, by filling the reference buffer with dummy frames without deleting data from the start point of the encoded audio data to an arbitrary point, the audio data preprocessing module 231 may perform processing to decode the audio data from the arbitrary point. Since a playback point is detected based on the reference buffer even when a specific point of encoded audio data is re-selected, the audio data preprocessing module 231 may perform processing to play the audio data without re-decoding.

When there is preview data relating to encoded audio data, the audio data preprocessing module 231 may store the preview data in a reference buffer in order to correspond to the last playback point of the audio data. For example, the audio data preprocessing module 231 may store stored preview data in a reference buffer at the end point of audio data in order to reduce the playback time of the audio data.

The audio data decoding module 232 decodes encoded audio data. According to an embodiment of the present disclosure, the audio data decoding module 232 may perform decoding from a specific point (for example, a playback requested point) of encoded audio data. During this operation, the audio data decoding module 232 may perform decoding of another point (for example, the start point of encoded audio data or a specified point adjacent to the playback requested point) of the encoded audio data at the same time or at about the same time when decoding the encoded audio data of a playback requested point. According to various embodiments of the present disclosure, after a specified time elapses while performing decoding of a playback requested point, the audio data decoding module 232 may perform decoding of another point (for example, the start point of encoded audio data or a specified point adjacent to the playback requested point).

Additionally, when there is preview data, the audio data decoding module 232 may perform decoding from a corresponding point of encoded audio data corresponding to the end point of the preview data stored in a reference buffer. The decoding may be performed based on the codec type of the audio data through a decoding function application included in the electronic device 101. According to an embodiment of the present disclosure, the audio data decoding module 232 may perform decoding from a non-decoded point (for example, the first (or start) point of the encoded audio data or a specified predetermined point) of the encoded audio data at the same time (or at about the same time) while performing decoding from a corresponding point of the encoded audio data corresponding to the end point of the preview data.

According to various embodiments of the present disclosure, the audio data preprocessing module 231 may generate a temporary file in the memory 130 instead of generating a reference buffer in relation to the audio data decoding. According to an embodiment of the present disclosure, an audio data player may identify audio data to be played based on the identifier (for example, a file descriptor) of a temporary file generated in the memory 130. The audio data preprocessing module 231 may repeatedly store a specified frame, for example, a dummy frame, in a temporary file in order to correspond to the full length formed when the encoded audio data is decoded. Additionally, when there is preview data relating to the encoded audio data, the audio data preprocessing module 231 may store the preview data in a temporary file in order to correspond to the last playback point of the audio data. According to an embodiment of the present disclosure, the audio data decoding module 232 may store decoded audio data at a corresponding point of a temporary file from a specific point of the encoded audio data.

Figure 3:
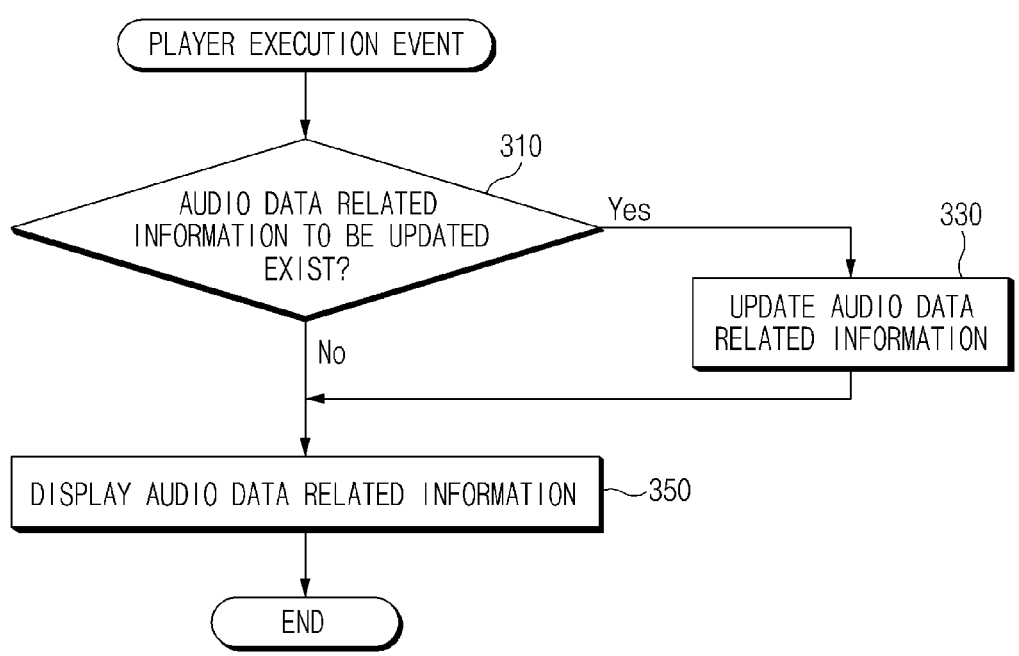
FIG. 3 is a flowchart illustrating an electronic device management method relating to an audio data player information update, according to an embodiment of the present disclosure.

FIG. 3 is a flowchart illustrating an electronic device operating method relating to an audio data player information update, according to an embodiment of the present disclosure.

Referring to FIG. 3, when a player execution event is received, the electronic device 100 connects to the server 106 providing streaming radio. In operation 310, the electronic device 101 determines whether there is station information or audio data related information, which is included in a station from the server 106, to be updated. According to an embodiment of the present disclosure, the electronic device 101 may determine whether there is information to be updated using information stored in the memory 130 based on version information of metadata or reception time information of metadata received from the server 106.

If there is information to be updated, the electronic device 101 collects and updates the station information or audio data related information, in operation 330. According to various embodiments of the present disclosure, the electronic device 101 collects and updates station information or audio data related information (for example, the genre, song title, artist name, codec type, bit rate, album art, description, or prefetch data of audio data) of the first item included in a corresponding station from the server 106.

When it is determined that there is not information to be updated in operation 310, or after the information is updated in operation 330, the electronic device 101 displays audio data related information by configuring an audio data player start screen, in operation 350. According to an embodiment of the present disclosure, the electronic device 101 displays text, such as a station number, name, or genre, based on the station information. Additionally, when an audio data player is executed at least once, the electronic device 101 may display the last playback item information (for example, the last playback station information and the last playback audio data related information included in the last playback station) stored when the audio data player is terminated. In the case of the cold start of an audio data player, the electronic device 101 may display specified item information (for example, specified station information or audio data related information of the first item included in a specified station) based on the station number or the order specified by a service/content provider providing streaming radio.

Figure 4:
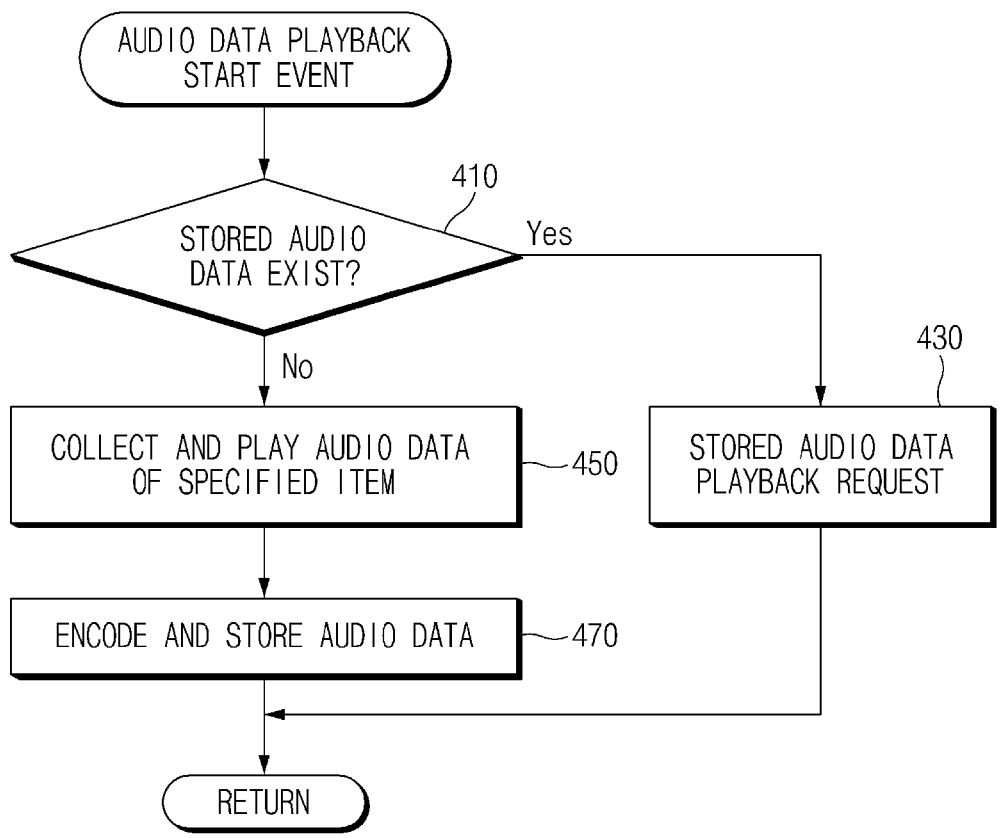
FIG. 4 is a flowchart illustrating an electronic device operating method relating to audio data playback, according to an embodiment of the present disclosure.

FIG. 4 is a flowchart illustrating an electronic device operating method relating to an audio data playback, according to an embodiment of the present disclosure.

Referring to FIG. 4, when receiving an audio data playback start event, the electronic device 101 determines whether audio data of a specified item is stored, in operation 410. According to various embodiments of the present disclosure, when an amount of audio data collected according to the request of a service/content provider providing streaming radio is greater than or equal to a predetermined size (for example, a data size of about 30 sec), the electronic device 101 may encode and store the audio data.

If there is stored audio data, the electronic device 101 requests playback of the stored audio data, in operation 430. If there is no stored audio data, the electronic device 101 collects and plays audio data of a specified item, in operation 450. According to various embodiments of the present disclosure, the electronic device 101 may play prefetch data among audio data related information of the specified item. The prefetch data, which is data used to reduce playback time in relation to streaming radio, may include data that is not encoded for a predetermined time (for example, 5 sec) from the start time of the specified audio data. According to an embodiment of the present disclosure, the electronic device 101 may play the prefetch data by delivering the prefetch data to the output buffer. While an audio data player is executed (that is, no pause or stop), the electronic device 101 may sequentially play data in the output buffer.

According to various embodiments of the present disclosure, the electronic device 101 may collect audio data related information of a previous item or a next item in relation to the specified item based on an audio data playback start request. For example, when audio data related information of a previous item or a next item of the specified item is not stored in the memory 130, or it is confirmed that there is information to be updated from the server 160, the electronic device 101 may collect audio data related information from the server 106.

According to various embodiments of the present disclosure, when audio data of the specified item is played for more than a predetermined time (for example, 1.5 sec), the electronic device 101 may collect audio data of the specified item from the server 106. Additionally, the electronic device 101 may play the collected audio data.

In operation 470, when an amount of collected audio data of the specified item is greater than or equal to a predetermined size (for example, a data size of about 30 sec), the electronic device 101 encodes and stores the collected audio data. According to various embodiments of the present disclosure, when the audio data of the specified item is terminated prior to playing the full length of the data, the electronic device 101 may store the last playback point and a predetermined size of un-encoded preview data corresponding to the last playback point.

According to various embodiments of the present disclosure, in relation to the audio data playback of the specified item, when an audio data designation change request occurs during operation 410 or 450, the electronic device 101 may perform operation 470. According to various embodiments of the present disclosure, when an audio data designation change request occurs during operation 430, or after operation 430 or 470 is completed, the electronic device 101 may display audio data related information of an item to be played in next (for example, the next item or a selected item), and may return to operation 410 in order to start playback of the corresponding audio data.

According to an embodiment of the present disclosure, based on a termination request of an audio data player, the electronic device 101 may perform operation 470 during operation 410 or operation 450. In this case, when operation 470 is completed, the electronic device 101 may deliver an audio data player termination event to the processor 120 in order to terminate the audio data player. Alternatively, while operation 430 is performed based on a termination request of an audio data player, the electronic device 101 may deliver an audio data player termination event to the processor 120 in order to terminate the audio data players.

Figure 5:
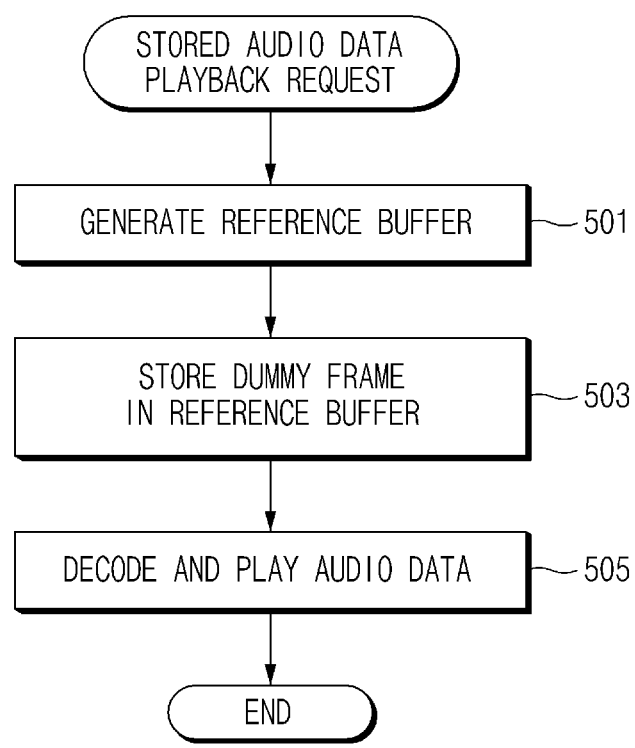
FIG. 5 is a flowchart illustrating an electronic device operating method relating to encoded audio data playback, according to an embodiment of the present disclosure.

FIG. 5 is a flowchart illustrating an electronic device operating method relating to encoded audio data playback, according to an embodiment of the present disclosure.

Referring to FIG. 5, when a stored audio data playback request occurs, the electronic device 101 generates a reference buffer corresponding to a full length formed when encoded audio data is decoded, in operation 501. According to an embodiment of the present disclosure, the electronic device 101 may generate a reference buffer by using information, such as, for example, a bit rate or a full length, among audio data related information.

In operation 503, the electronic device 101 repeatedly stores a dummy frame in the generated reference buffer to correspond to the full length. The dummy frame is generated using the format or codec type of the audio data, and may be played by an audio data player. By filling the reference buffer with dummy frames, when selecting and playing an arbitrary point of encoded audio data, the electronic device 101 may perform decoding from a point of the reference buffer corresponding to the arbitrary point. According to various embodiments of the present disclosure, when there is preview data of the audio data, the electronic device 101 may store the preview data in the reference buffer in order to correspond to the last playback point of the audio data. The electronic device 101 may perform processing to deliver the preview data to the output buffer and play it.

In operation 505, the electronic device 101 decodes encoded audio data and plays the decoded data. According to an embodiment of the present disclosure, the electronic device 101 may perform decoding based on the codec type of the audio data through a decoding function application included in the electronic device 101. According to various embodiments of the present disclosure, the electronic device 101 may perform decoding from a specific point of encoded audio data. According to various embodiments of the present disclosure, when there is preview data stored in the reference buffer, the electronic device 101 may perform decoding from a point of encoded audio data corresponding to the end point of the stored preview data. According to various embodiments of the present disclosure, the electronic device 101 may perform decoding from a point (for example, a first (start) point of the encoded audio data or a specified predetermined point) where encoded audio data is not decoded while (or at about the same time as) decoding from a specific point of the encoded audio data.

According to various embodiments of the present disclosure, the electronic device 101 may generate a temporary file in the memory 130 instead of the reference buffer in operation 501. In operation 503, the electronic device 101 may repeatedly store a dummy frame in the temporary file to correspond to the full length formed when encoded audio data is decoded. Additionally, when there is preview data of the audio data, the electronic device 101 may store the preview data in the temporary file in order to correspond to the last playback point of the audio data. The electronic device 101 may perform processing to deliver the preview data to the output buffer and play it.

In operation 505, the electronic device 101 may store decoded audio data at a corresponding point of the temporary file from a specific point of the encoded audio data. Additionally, when there is preview data, decoded audio data may be stored at a corresponding point of the temporary file from a corresponding point of the encoded audio data corresponding to the end point of the stored preview data. According to various embodiments of the present disclosure, the electronic device 101 may perform decoding from a point (for example, a first (start) point of the encoded audio data or a specified predetermined point) where the encoded audio data is not decoded while (or at about the same time as) decoding from a specific point of the encoded audio data, and then may store the decoded data at a corresponding point of a temporary file.

Figure 6:
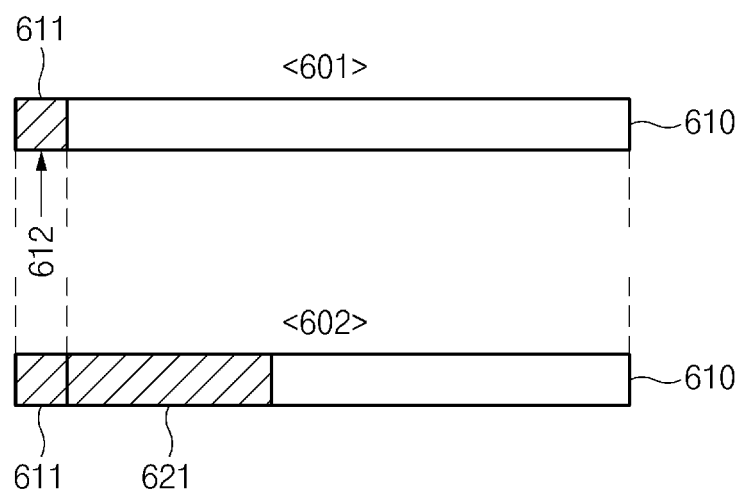
FIG. 6 is a diagram illustrating an audio data playback related buffer, according to an embodiment of the present disclosure.

FIG. 6 is a diagram illustrating an audio data playback related buffer, according to an embodiment of the present disclosure.

Referring to FIG. 6, the electronic device 101 generates an output buffer 610 where audio data, which is to be outputted through an output device such as a speaker included in the input/output interface 150, is stored in relation to audio data playback. While an audio data player is executed (that is, there is no pause or stop), the electronic device 101 may sequentially play data in the output buffer 610.

According to various embodiments of the present disclosure, the electronic device 101 may collect data for playback time reduction, for example, prefetch data 611, in relation to streaming radio. As shown in 601, the electronic device 101 delivers the prefetch data 611 to the output buffer 610 based on an audio data playback start event.

According to various embodiments of the present disclosure, when specified audio data is played for more than a predetermined time (for example, 1.5 sec), and thus, a playback point passes a specific point 612 of the output buffer 610, as shown in 602, the electronic device 101 collects the remaining partial data 621 of the audio data from the server 106. The remaining partial data 621 may be all or a part of the audio data, excluding the prefetch data 611.

Figure 7:
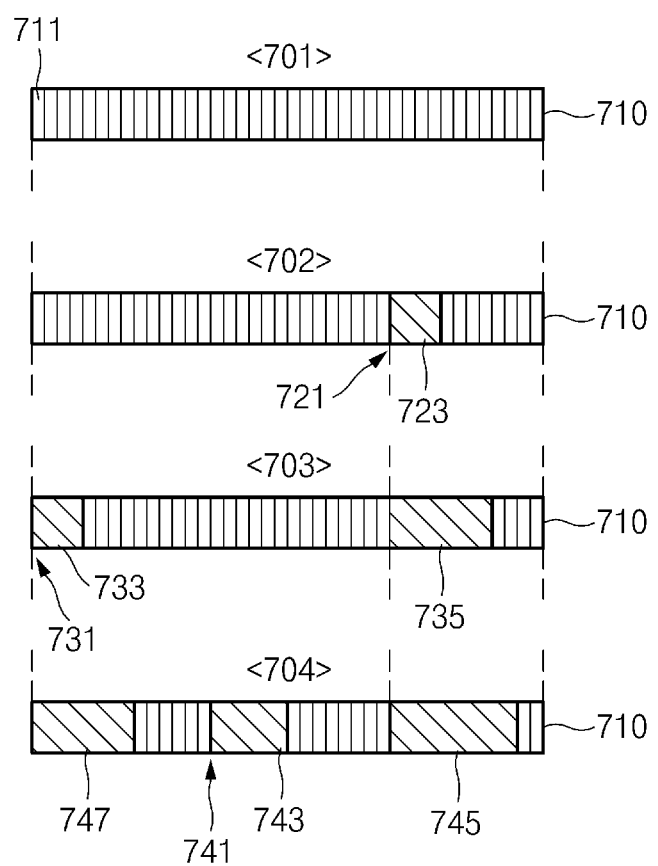
FIG. 7 is a diagram illustrating an audio data decoding related buffer or file, according to an embodiment of the present disclosure.

FIG. 7 is a diagram illustrating an audio data decoding related buffer or file, according to an embodiment of the present disclosure.

Referring to FIG. 7, the electronic device 101 generates a reference buffer 710 corresponding to a full length formed when encoded audio data is decoded based on audio data related information. As shown in 701, the electronic device 101 repeatedly stores a dummy frame 711 in the generated reference buffer 710 to correspond to the full length. The dummy frame 711 is generated using the format or codec type of the audio data and may be played by an audio data player. By filling the reference buffer 710 with dummy frames 711, when an audio data player selects an arbitrary point of the encoded audio data as a start point and plays the audio data, the electronic device 101 may play the audio data without playback time delay or re-decoding.

As shown in 702, the electronic device 101 performs decoding from a specific point of encoded audio data to store decoded data 723 from a point 721 of the reference buffer 710 corresponding to the specific point of the encoded audio data. As shown in 703, the electronic device 101 performs decoding from a point (for example, a first (start) point of encoded audio data or a specified predetermined point) where encoded audio data is not decoded while (or at about the same time as) performing decoding from the specific point of encoded audio data (as shown in 702), and then may store decoded data 733 from point 731 of the reference buffer 710, corresponding to the point in the encoded audio data. In this case, the electronic device 101 continuously stores the decoded data 735 from the specific point.

According to various embodiments of the present disclosure, when an audio data player moves to a new point of the encoded audio data and starts to play the new point, as shown in 704, the electronic device 101 decodes encoded audio data corresponding to the new point to store decoded data 743 from a point 741 of the reference buffer 710 corresponding to the new point. The electronic device 101 continuously stores data 745 decoded from the specific point (as shown in 702) and data 747 decoded from the point (as shown in 703). Additionally, the electronic device 101 may deliver the decoded data 743 to an output buffer and play it through an output device.

According to various embodiments of the present disclosure, the electronic device 101 may generate a temporary file in the memory 130 instead of the reference buffer 710. The electronic device 101 may store the dummy frame 711 in the temporary file repeatedly to correspond to the full length formed when encoded audio data is decoded. The electronic device 101 may control the decoding point (for example, a playback requested point) detection and decoding of the above-mentioned encoded audio data on the basis of the temporary file including the plurality of dummy frames 711. For example, the electronic device 101 may generate the temporary file including the plurality of dummy frames 711 corresponding to the full length of encoded audio data and may detect a dummy frame position of a playback requested point on the basis of the generated temporary file. The electronic device 101 may detect a frame of encoded audio data corresponding to the dummy frame position and perform decoding from the detected frame, thereby processing decoding from the playback requested point for the encoded audio data. During the above operation, the electronic device 101 may store the decoded data in the temporary file. For example, the electronic device 101 may store the decoded data in the dummy frame of the temporary file corresponding to the frame position of the encoded audio data. Accordingly, the electronic device 101 may replace the entire dummy frames of the temporary file with decoded data.

According to various embodiments of the present disclosure, the electronic device 101 may process decoding from another point (for example, the start point of encoded audio data or a predetermined point adjacent to a playback requested point) at the same time or at about the same time when processing the decoding of the playback requested point. The electronic device 101 may store decoded data in dummy frames and output them.

Figure 8:
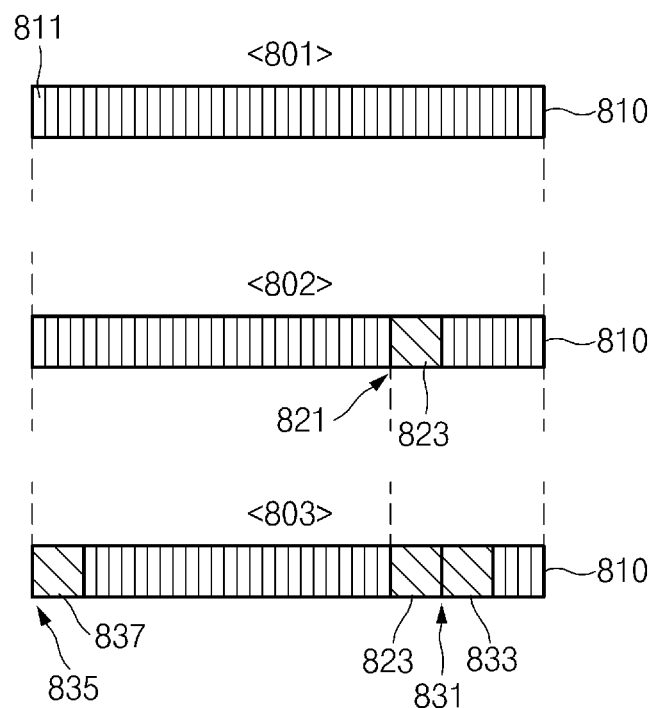
FIG. 8 is a diagram illustrating an audio data decoding related buffer or file relating to preview data use, according to an embodiment of the present disclosure.

FIG. 8 is a diagram illustrating an audio data decoding related buffer or file relating to preview data use, according to an embodiment of the present disclosure.

Referring to FIG. 8, the electronic device 101 generates a reference buffer 810 corresponding to a full length formed when encoded audio data is decoded based on audio data related information. As shown in 801, the electronic device 101 repeatedly stores a dummy frame 711 in the generated reference buffer 810 to correspond to the full length.

As shown in 802, the electronic device 101 stores preview data 823 relating to the encoded audio data in a predetermined area from a point 821 of the reference buffer 810 in order to correspond to the last playback point of the audio data. The preview data 823 is for the playback time reduction of encoded audio data, and may include a predetermined range of un-encoded audio data including at least part of a point temporally before or after the last playback point or a reference point based on the last playback point.

As shown in 803, the electronic device 101 performs decoding from a point of the encoded audio data corresponding to an end point of the preview data 823, and stores decoded data 833 in the reference buffer 810 from an end point 831 of the preview data 823. According to various embodiments of the present disclosure, the electronic device 101 performs decoding from a point (for example, a first (start) point of encoded audio data or a specified predetermined point) where encoded audio data is not decoded while (or at about the same time as) performing decoding from a corresponding point of encoded audio data corresponding to the end point 831 of the preview data 823, and stores the decoded data 837 from a point 835 of the reference buffer 810 corresponding to the point where encoded audio data is not decoded.

According to various embodiments of the present disclosure, the electronic device 101 may generate a temporary file in the memory 130 instead of a reference buffer 810. The electronic device 101 may store the dummy frame 811 in the temporary file repeatedly to correspond to the full length formed when encoded audio data is decoded. The electronic device 101 may perform a decoding process of encoded audio data relating to a preview data use performed based on the temporarily file similarly or identically to a process based on the reference buffer 810.

Figure 9:
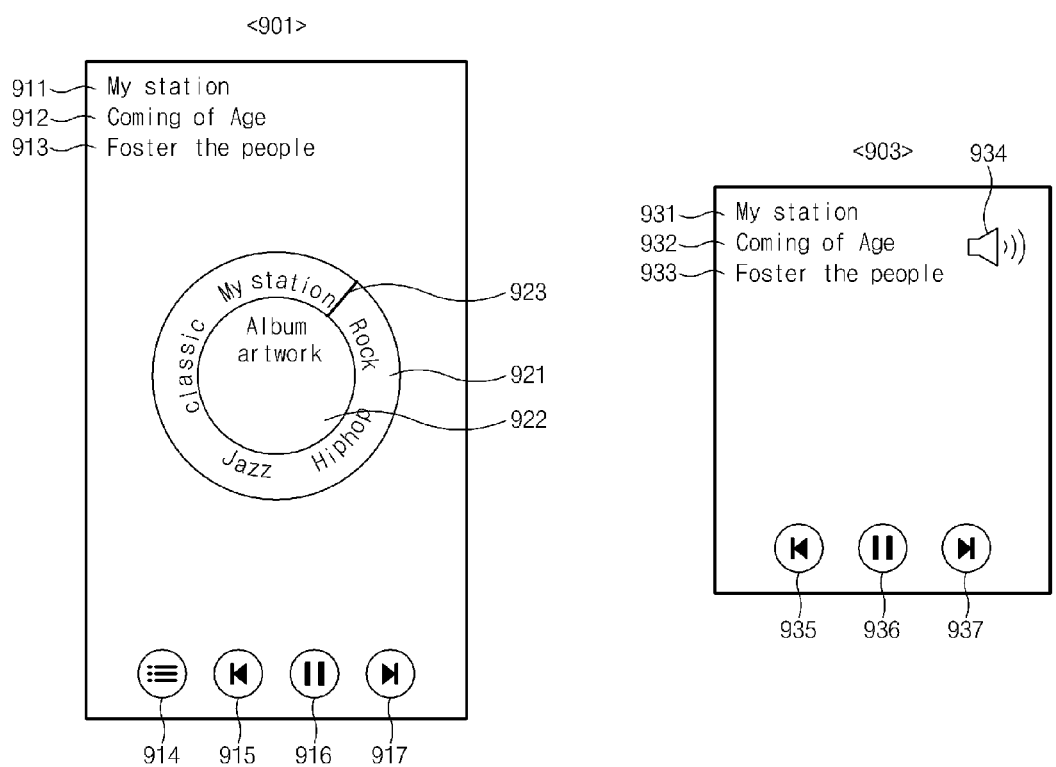
FIG. 9 is a diagram illustrating an audio data player screen, according to an embodiment of the present disclosure.

FIG. 9 is a diagram illustrating an audio data player screen, according to an embodiment of the present disclosure.

Referring to FIG. 9, the electronic device 101 displays a start screen 901 of an audio data player (for example, a streaming radio player) based on a player execution event. According to an embodiment of the present disclosure, the start screen 901 includes station information 911, a song title 912, an artist name 913, a player control menu 914, a previous item playback button 915, a play/pause button 916, a next item play back button 917, a station selection dial 921, album art 922, and a station indicator 923 in relation to a streaming radio function.

According to various embodiments of the present disclosure, the electronic device 101 displays an audio data player start screen 903 based on a player execution event in an electronic device having a relatively small screen, such as a wearable device. The audio data player start screen 903 includes station information 931, a song title 932, an artist name 933, an audio volume level setting icon 934, a previous item playback button 935, a play/pause button 936, and a next item playback button 937.

A station is as a group of audio data set by a service/content provider providing streaming radio, and may have a theme obtained by binding each genre, each artist, each recent song, or each subject. The station information 911 and 931 may be an object including text, such as a station number, name, or genre. The song title 912 and 932 may be an object including text, such as the song title of specified piece of audio data. The artist name 913 and 933 may be an object including text, such as the artist name of specified piece of audio data.

According to various embodiments of the present disclosure, when text included in station information 911 and 931, the song title (912 and 932, or the artist name 913 and 933 is long and is out of the area of the object, the electronic device 101 may scroll and process the corresponding text in a predetermined direction within the area of the object and display it. The electronic device 101 may fade-out a part of a text that is out of the area of the object.

According to various embodiments of the present disclosure, the electronic device 101 may display a page including audio data related information pre-stored in the memory 130, or a detailed description of specified audio data provided from the server 106, based on a selection of the song title 912 and 932.

According to various embodiments of the present disclosure, the electronic device 101 may display a page including audio data related information pre-stored in the memory 130, or an artist related description of specified audio data provided from the server 106, based on a selection of the artist name 913 and 933.

The player control menu 914 sets a function relating to a player, and may include an object (for example, an image, a list, a pop-up, etc.) including items such as, for example, an audio volume level setting, a station selection, or a display function setting.

The audio volume level setting icon 934 has a function for setting an audio volume level. According to various embodiments of the present disclosure, the electronic device 101 may display a section of audio volume level and an object (for example, an image, a pop-up, etc.) for indicating a current audio volume level, based on a selection of the audio volume level setting icon 934.

The previous item playback button 915 and 935 may perform an audio data playback restart function of a specified item or a playback start function of audio data corresponding to a previous item. According to an embodiment of the present disclosure, when audio data of a specified item is played for more than a predetermined time (for example, 5 sec) from a start point, the electronic device 101 may play the audio data again from the start point of specified audio data based on a selection of the previous item playback button 915 and 935. Additionally, when audio data of a specified item is not played for more than a predetermined time (for example, 5 sec) from a start point, the electronic device 101 may play the audio data corresponding to a previous item based on a selection of the previous item playback button 915 and 935. In this case, the electronic device 101 may collect or display audio data related information of a previous item. Before completing an operation for collecting or displaying audio data related information of a previous item, the electronic device 101 may deactivate and process a previous item playback button, and after completing the operation, reactivate and process the previous item playback button 915 and 935. According to various embodiments of the present disclosure, in the case of the cold start of an audio data player or the first entry of the station, the electronic device 101 may perform a control to dim-process or deactivate and process the previous item playback button 915 and 935.

The play/pause button 916 and 936 have a function for playing or pausing audio data of a specified item. According to various embodiments of the present disclosure, the electronic device 101 may toggle the playback function and the pause function. For example, when the playback function is executed, the electronic device 101 may display the play/pause button 916 and 936 as an object (for example, an image or button) indicating a pause function. Additionally, when the playback function is executed, the electronic device 101 may perform a control to display the play/pause button 916 and 936 as an object (for example, an image or button) for indicating a playback function.

The next item playback button 917 and 937 have a function for playing audio data corresponding to the next item of a specified item. The electronic device 101 may collect or display audio data related information of the next item. Before completing an operation for collecting or displaying audio data related information of the next item, the electronic device 101 may deactivate and process the next item playback button 917 and 937, and after completing the operation, reactivate and process the next item playback button 917 and 937.

The station selection dial 921 has a function for selecting a station. The station selection dial 921 may include an object (for example, an image, a button, or an icon) including information (for example, the name or genre of a station) for currently specified stations. The electronic device 101 may display the station selection dial 921 in a predetermined form (or shape) in a predetermined area of a screen. According to various embodiments of the present disclosure, when there is no input from a user for a predetermined time (for example, 6 sec), the electronic device 101 may remove the station selection dial 921 from the display. According to various embodiments of the present disclosure, when an input (for example, a tapping or hovering input) from a user occurs while the station selection dial 921 is not displayed, the electronic device 101 may display the station selection dial 921 in a predetermined area.

According to various embodiments of the present disclosure, the electronic device 101 may process an event relating to an operation (for example, dialing) for selecting a station in relation to the station selection dial 921. The dialing may include a rotating operation when a user presses a predetermined area of the station selection dial 921. The dialing may include an indication mode of a fast dial mode or a slow dial mode, according to an area of the station selection dial 921. The fast dialing mode may correspond to a rotating operation when a user presses an outside area, excluding the frame of the station selection dial 921. Additionally, the slow dialing mode may correspond to a rotating operation when a user presses an inner area, including the frame of the station selection dial 921. According to various embodiments of the present disclosure, the electronic device 101 may display the station name, song title, artist name, or album art of specified audio data according to dialing.

The album art 922 may be an object displaying the album art of specified audio data. If there is no album art relating to the specified audio data, the album art 922 may include a pre-stored basic album art. According to various embodiments of the present disclosure, the electronic device 101 may display the album art of specified audio data in a full screen or in an area of the album art 922. For example, while the station selection dial 921 is displayed on the screen, the electronic device 101 may display the album art of the specified audio data within an area of the album art 922. The electronic device 101 may display the album art of the specified audio data dimly in full screen, or may remove a previously displayed album art and display it in full screen. Additionally, for example, when the station selection dial 921 is removed from the screen, the electronic device 101 may remove the album art 922. The electronic device 101 may display the album art of specified audio data in full screen.

The station indicator 923 is an object indicating the location of specified audio data among items included in a station. The station indicator 923 may include an object (for example, an image, a line, or an icon) displayed in a predetermined area of the station selection dial 921. For example, the station indicator 923 may be displayed in the frame area of the station selection dial 921 or a predetermined area inside the frame. According to various embodiments of the present disclosure, the electronic device 101 may display at least one of the form (or shape), transparency, and color of the station indicator 923 differently according to an indication mode (for example, a fast dial mode or a slow dial mode) of the station selection dial 921.

Figure 10:
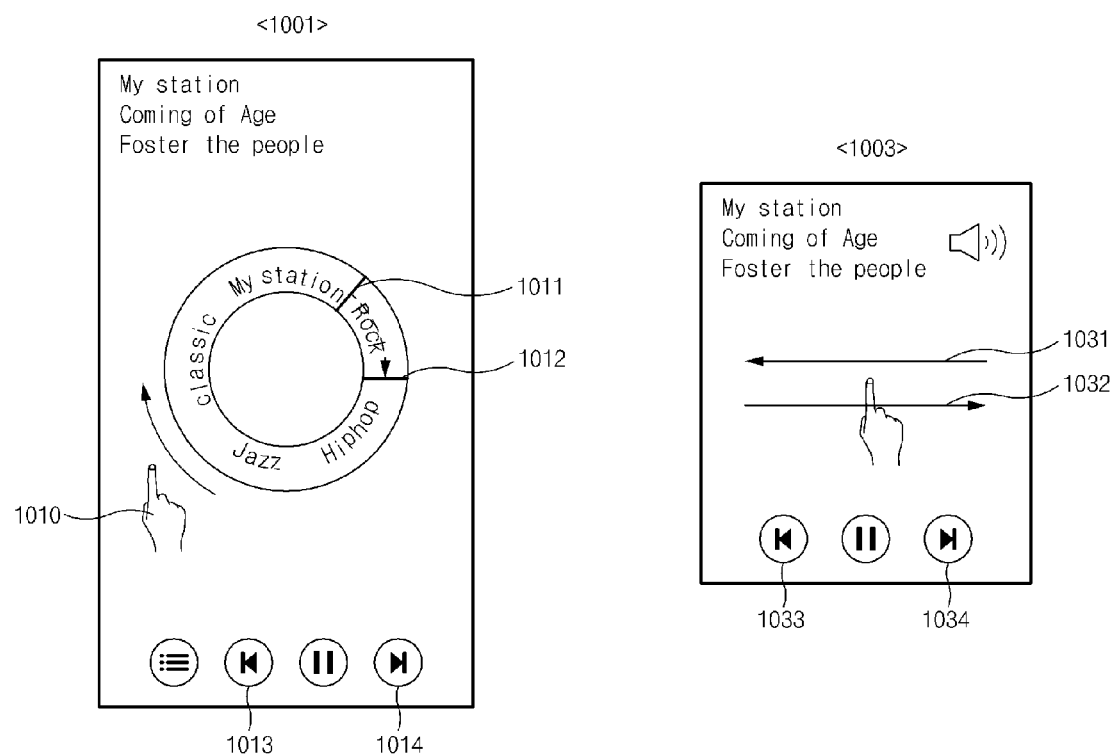
FIG. 10 is a diagram illustrating an audio data designation change related screen, according to an embodiment of the present disclosure.

FIG. 10 is a diagram illustrating an audio data designation change related screen, according to an embodiment of the present disclosure.

Referring to FIG. 10, in a first screen 1001, the electronic device 101 processes an event relating to an operation for selecting a station (for example, dialing 1010). The electronic device 100 ma move and display a station indicator object (for example, an image, a line, or an icon) for indicating the position of audio data selected based on the dialing 1010. According to various embodiments of the present disclosure, if the dialing 1010 is in a clockwise direction while pressing a predetermined area relating to a station selection dial, the electronic device 101 may move the station indicator object from a position 1011 to a position 1012, corresponding to the position of the selected audio data and display it. The electronic device 101 may trace the station indicator object from the position 1011 to the position 1012 and display it.

The electronic device 101, as shown in a second screen 1003, may generate a specific change event of audio data based on a selection of the previous item playback button 1033 or the next item playback button 1034, in an electronic device having a relatively small screen, such as a wearable device. According to various embodiments of the present disclosure, the electronic device 101 may perform the same function as the next item playback button 1034 based on a first operation 1031 (for example, a left flick operation while pressing a predetermined point of a screen), and may perform the same function as the previous item playback button 1033 based on a second operation 1032 (for example, a right flick operation while pressing a predetermined point of a screen).

According to various embodiments of the present disclosure, when collected audio data before a change is greater than a predetermined size (for example, a data size of about 30 sec), the electronic device 101 may encode and store the audio data based on a station selection change operation (for example, the operation 1010), an item selection change operation (for example, the operation 1031 or the operation 1032), a selection of a previous item playback button (for example, the buttons 1013 or 1033), or a selection of a next item playback button (for example, the buttons 1014 and 1034). Additionally, the electronic device 101 may generate a designation change event of audio data based on a selection change operation. Additionally, according to various embodiments of the present disclosure, when audio data is encoded and stored after a change based on a selection change operation, the electronic device 101 may decode the encoded audio data and play it.

Figure 11:
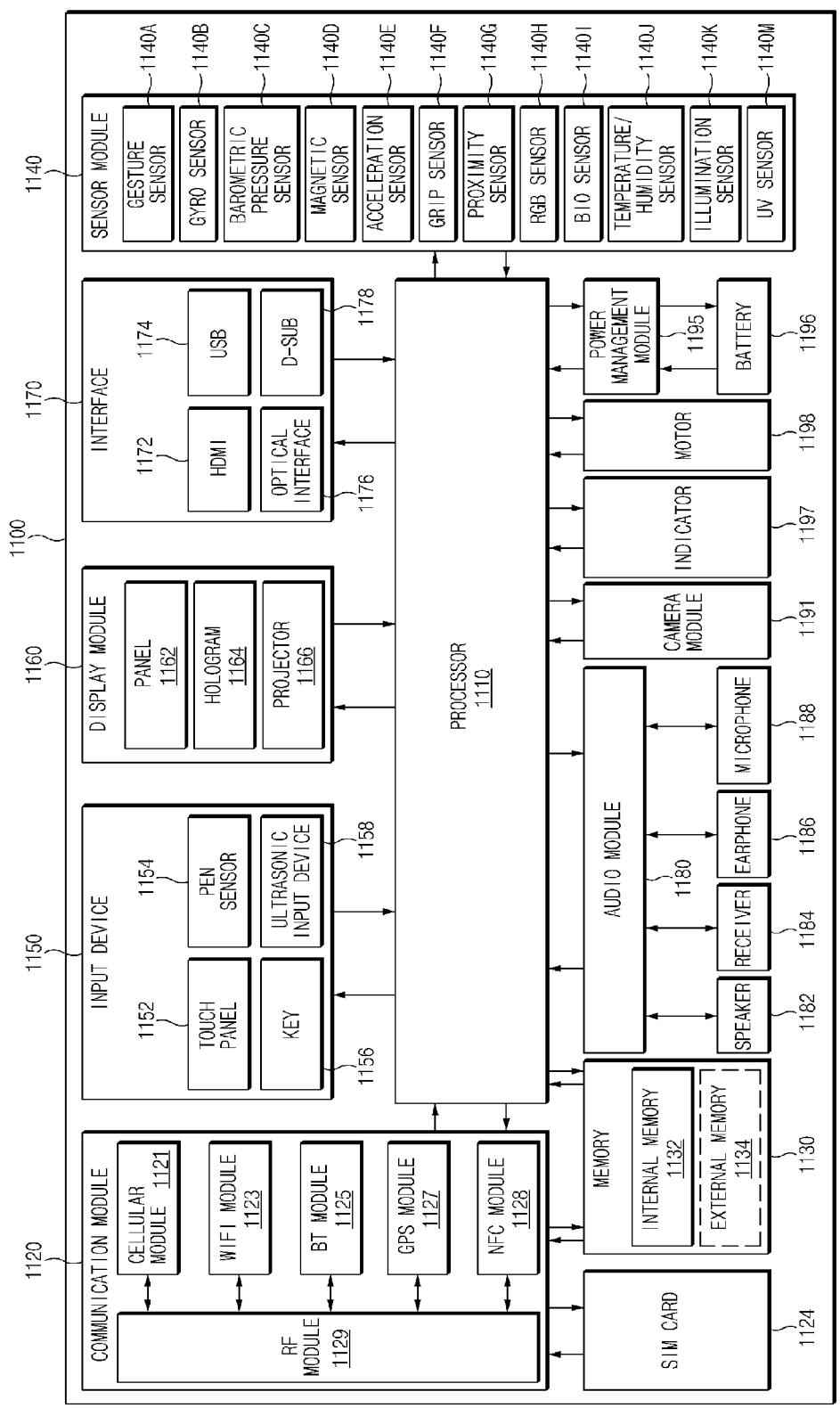
FIG. 11 is a block diagram illustrating an electronic device, according to an embodiment of the present disclosure.

FIG. 11 is a block diagram illustrating an electronic device, according to an embodiment of the present disclosure.

Referring to FIG. 11, an electronic device 1100, for example, may configure all or part of the above-described electronic device 101 of FIG. 1. The electronic device 1100 includes at least one processor (for example, an AP 1110), a communication module 1120, a subscriber identification module (SIM) card 1124, a memory 1130, a sensor module 1140, an input device 1150, a display module 1160, an interface 1170, an audio module 1180, a camera module 1191, a power management module 1195, a battery 1196, an indicator 1197, and a motor 1198.

The processor 1110 may control a plurality of hardware and/or software components connected to the processor 1110 and also may perform various data processing and operations by executing an operating system or an application program. The processor 1110 may be implemented with a system on chip (SoC), for example. According to an embodiment of the present disclosure, the processor 1110 may further include a graphic processing unit (GPU) and/or an image signaling processor. The processor 1110 may include at least part (for example, a cellular module 1121) of components shown in FIG. 11. The processor 1110 may load commands or data received from at least one of the other components (for example, nonvolatile memory) and process them, and may store various data in a nonvolatile memory.

The communication module 1120 may have the same or a similar configuration as that of the communication interface 170 of FIG. 1. The communication module 1120 includes a cellular module 1121, a WiFi module 1123, a BT module 1125, a GPS module 1127, an NFC module 1128, and a radio frequency (RF) module 1129.

The cellular module 1121, for example, may provide voice call, video call, text service, or internet service through a communication network. According to an embodiment of the present disclosure, the cellular module 1121 may perform a distinction and authentication operation on the electronic device 1100 in a communication network by using the SIM card 1124. According to an embodiment of the present disclosure, the cellular module 1121 may perform at least a part of a function that the processor 1110 provides. According to an embodiment of the present disclosure, the cellular module 1121 may further include a communication processor (CP).

Each of the WiFi module 1123, the BT module 1125, the GPS module 1127, and the NFC module 1128 may include a processor for processing data transmitted/received through a corresponding module. According to an embodiment of the present disclosure, at least part (for example, at least one) of the cellular module 1121, the WiFi module 1123, the BT module 1125, the GPS module 1127, and the NFC module 1128 may be included in one integrated chip (IC) or IC package.

The RF module 1129, for example, may transmit/receive communication signals (for example, RF signals). The RF module 1129, for example, may include a transceiver, a power amp module (PAM), a frequency filter, a low noise amplifier (LNA), or an antenna. According to another embodiment of the present disclosure, at least one of the cellular module 1121, the WiFi module 1123, the BT module 1125, the GPS module 1127, and the NFC module 1128 may transmit/receive RF signals through a separate RF module.

The SIM card 1124, for example, may include a card including a SIM and/or an embedded SIM and also may include unique identification information (for example, an integrated circuit card identifier (ICCID)) or subscriber information (for example, an international mobile subscriber identity (IMSI)).

The memory 1130 (for example, the memory 130) includes at least one of an internal memory 1132 and an external memory 1134. The internal memory 1132 may include at least one of a volatile memory (for example, dynamic random access memory (RAM) (DRAM), static RAM (SRAM), synchronous dynamic RAM (SDRAM)) and a non-volatile memory (for example, one time programmable read only memory (ROM) (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 1134 may further include a flash drive, for example, compact flash (CF), secure digital (SD), Micro-SD, Mini-SD, extreme digital (xD), multimedia card (MMC), or a memorystick. The external memory 1134 may be functionally and/or physically connected to the electronic device 1100 through various interfaces.

The sensor module 1140 measures physical quantities or detects an operating state of the electronic device 1100, thereby converting the measured or detected information into electrical signals. The sensor module 1140 includes at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (for example, a red, green, blue (RGB) sensor), a biometric sensor 1140I, a temperature/humidity sensor 1140J, an illumination sensor 1140K, and an ultra violet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1140 may further include a control circuit for controlling at least one sensor therein. According to an embodiment of the present disclosure, the electronic device 1100 may further include a processor configured to control the sensor module 1140 as part of or separately from the processor 1110, and thus, may control the sensor module 1140 while the processor 1110 is in a sleep state.

The input device 1150 includes at least one of a touch panel 1152, a (digital) pen sensor 1154, a key 1156, and an ultrasonic input device 1158. The touch panel 1152 may use at least one of capacitive, resistive, infrared, or ultrasonic methods, for example. Additionally, the touch panel 1152 may further include a control circuit. The touch panel 1152 may further include a tactile layer to provide tactile response to a user.

The (digital) pen sensor 1154, for example, may include a sheet for recognition as part of a touch panel or a separate sheet for recognition. The key 1156 may include a physical button, an optical key, or a keypad, for example. The ultrasonic input device 1158 may detect ultrasonic waves generated from an input tool through a microphone 1188 in order to check data corresponding to the detected ultrasonic waves.

The display module 1160 (for example, the display 160) includes at least one of a panel 1162, a hologram device 1164, and a projector 1166. The panel 1162 may have the same or similar configuration to the display 160 of FIG. 1. The panel 1162 may be implemented to be flexible, transparent, or wearable, for example. The panel 1162 and the touch panel 1152 may be configured with one module. The hologram 1164 may show three-dimensional images in the air by using the interference of light. The projector 1166 may display an image by projecting light on a screen. The screen, for example, may be placed inside or outside the electronic device 1100. According to an embodiment of the present disclosure, the display 1160 may further include a control circuit for controlling the panel 1162, the hologram device 1164, or the projector 1166.

The interface 1170 includes at least one of an HDMI 1172, a USB 1174, an optical interface 1176, or a D-subminiature (sub) 1178, for example. The interface 1170, for example, may be included in the communication interface 170 shown in FIG. 1. Additionally or alternatively, the interface 1170 may include a mobile high-definition link (MHL) interface, an SD card/MMC interface, or an infrared data association (IrDA) standard interface.

The audio module 1180 may convert sound into electrical signals and convert electrical signals into sounds. At least some components of the audio module 1180, for example, may be included in the input/output interface 150 of FIG. 1. The audio module 1180 may process sound information inputted/outputted through a speaker 1182, a receiver 1184, an earphone 1186, or a microphone 1188.

The camera module 1191 is a device for capturing a still image and a video, and may include at least one image sensor (for example, a front sensor or a rear sensor), a lens, an image signal processor (ISP), and a flash (for example, an LED or a xenon lamp).

The power management module 1195 may manage the power of the electronic device 1100. According to an embodiment of the present disclosure, the power management module 1195 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1196, or a voltage, current, or temperature thereof during charging. The battery 1196, for example, may include a rechargeable battery and/or a solar battery.

The indicator 1197 may display a specific state of the electronic device 1100 or part thereof (for example, the processor 1110), for example, a booting state, a message state, or a charging state. The motor 1198 may convert electrical signals into mechanical vibration, and may generate vibration or haptic effect. Although not shown in the drawings, the electronic device 1100 may include a processing device (for example, a GPU) for mobile TV support. A processing device for mobile TV support may process media data according to the standards such as, for example, digital multimedia broadcasting (DMB), digital video broadcasting (DVB), or mediaFLO.

Each of the above-described components of the electronic device, according to embodiments of the present disclosure, may be configured with at least one component and the name of a corresponding component may vary according to the kind of electronic device. According to embodiments of the present disclosure, an electronic device may include at least one of the above-described components, may not include some of the above-described components, or may include at least one additional component. Additionally, some of components in an electronic device, according to various embodiments of the present disclosure, are configured as one entity, so that functions of previous corresponding components are performed identically.

Figure 12:
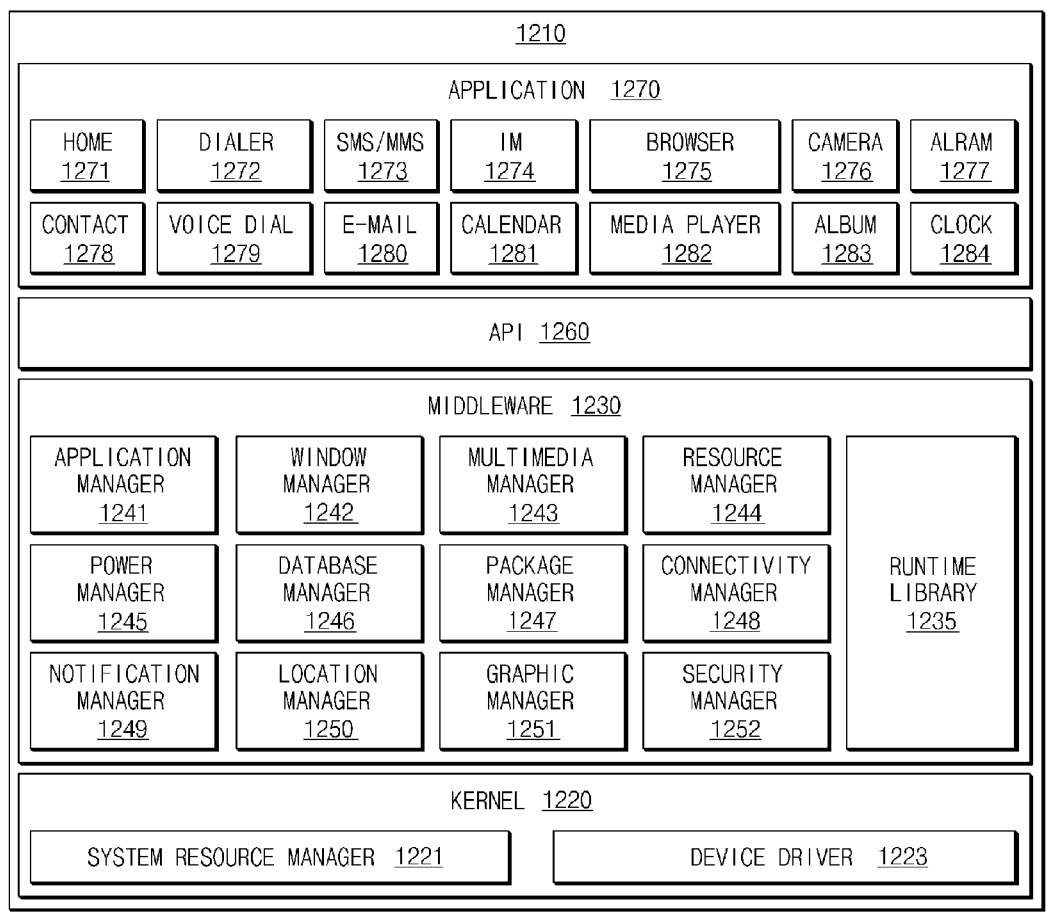
FIG. 12 is a diagram illustrating a program module, according to an embodiment of the present disclosure.

FIG. 12 is diagram illustrating a program module, according to an embodiment of the present disclosure.

A program module 1210 (for example, the program 140) may include an OS for controlling a resource relating to an electronic device (for example, the electronic device 101) and/or various applications (for example, the application program 147) running on the OS.

The program module 1210 includes a kernel 1220, middleware 1230, an API 1260, and an application 1270. At least part of the program module 1210 may be preloaded on an electronic device or may be downloaded from a server (for example, the first and second external electronic devices 102 and 104 and the server device 106).

The kernel 1220 (for example, the kernel 141) includes a system resource manager 1221 and a device driver 1223. The system resource manager 1221 may perform the control, allocation, or retrieval of a system resource. According to an embodiment of the disclosure, the system resource manager 1221 may include a process management unit, a memory management unit, or a file system management unit. The device driver 1223 may be embodied as a display driver, a camera driver, a BT driver, a sharing memory driver, a USB driver, a keypad driver, a WiFi driver, an audio driver, or an inter-process communication (IPC) driver.

The middleware 1230, for example, may provide a function that the application 1270 commonly requires, or may provide various functions to the application 1270 through the API 1260 in order to allow the application 1270 to efficiently use a limited system resource inside the electronic device. According to an embodiment of the disclosure, the middleware 1230 (for example, the middleware 143) includes at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235 may include a library module that a complier uses to add a new function through a programming language while the application 1270 is running. The runtime library 1235 may perform a function on input/output management, memory management, or an arithmetic function.

The application manager 1241 may mange the life cycle of at least one application among the applications 1270. The window manager 1242 may manage a GUI resource used in a screen. The multimedia manager 1243 may recognize a format for playing various media files and may encode or decode a media file by using the codec corresponding to a corresponding format. The resource manager 1244 may manage a resource such as a source code, a memory, or a storage space of at least any one of the applications 1270.

The power manager 1245 may operate together with a basic input/output system (BIOS) to manage the battery or power and may provide power information necessary for an operation of the electronic device. The database manager 1246 may create, search, or modify a database used in at least one application among the applications 1270. The package manager 1247 may manage the installation or update of an application distributed in a package file format.

The connectivity manger 1248 may manage a wireless connection, such as WiFi or Bluetooth. The notification manager 1249 may display or notify an event, such as arrival messages, appointments, and proximity alerts, to a user in a manner in which the user is not interrupted. The location manager 1250 may manage location information on an electronic device. The graphic manager 1251 may manage a graphic effect to be provided to a user or a user interface relating thereto. The security manager 1252 may provide various security functions necessary for system security or user authentication. According to an embodiment, when an electronic device (for example, the electronic device 101) includes a phone function, the middleware 1230 may further include a telephony manager for managing a voice or video call function of the electronic device.

The middleware 1230 may include a middleware module for forming a combination of various functions of the above-described components. The middleware 1230 may provide a module specialized for each type of OS to provide differentiated functions. Additionally, the middleware 1230 may delete part of the existing components or add new components dynamically.

The API 1260 (for example, the API 145), for example, as a set of API programming functions, may be provided as another configuration according to the OS. For example, ione API set may be provided for each platform or at least two API sets may be provided for each platform.

The application 1270 (for example, the application program 147) may include at least one application for providing functions such as, for example, a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, a clock 1284, health care (for example, measure an exercise amount or blood sugar), or environmental information provision (for example, provide air pressure, humidity, or temperature information).

According to an embodiment of the present disclosure, the application 1270 may include an application (hereinafter referred to as "information exchange application") for supporting information exchange between the electronic device (for example, the electronic device 101) and an external electronic device (for example, the first and second external electronic devices 102 and 104). The information exchange application, for example, may include a notification relay application for relaying specific information to the external device or a device management application for managing the external electronic device.

For example, the notification relay application may have a function for relaying to an external electronic device (for example, the first and second external electronic devices 102 and 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the first and second external electronic devices 102 and 104) communicating with the electronic device, an application operating in the external electronic device, or a service (for example, call service or message service) provided from the external device.

According to an embodiment of the disclosure, the application 1270 may include a specified application (for example, a health care application of a mobile metical device) according to the property of an external electronic device (for example, the first and second external electronic devices 102 and 104). According to an embodiment, the application 1270 may include an application received from an external electronic device (for example, the server 106 or the first or second external electronic device 102 or 104). According to an embodiment of the disclosure, the application 1270 may include a preloaded application or a third party application downloadable from a server. The names of components in the program module 1210 may vary depending on the type of OS.

According to various embodiments of the present disclosure, at least part of the program module 1210 may be implemented with software, firmware, hardware, or a combination thereof. At least part of the programming module 1210, for example, may be implemented (for example, executed) by a processor (for example, the processor 1010). At least part of the programming module 1210 may include a module, a program, a routine, sets of instructions, or a process to perform at least one function, for example.

According to an embodiment of the present disclosure, by decoding encoded audio data with a dummy frame, even when a specific point of the encoded audio data is played first, the encoded audio data may be played without standby time.

According to an embodiment of the present disclosure, by decoding encoded audio data with a dummy frame, even when a movement for a specific point of the encoded audio data is made, the encoded audio data may be played.

The term "module", as used herein, may refer to a unit including a combination of at least one of hardware, software, and firmware. The term "module" and the terms "unit", "logic", "logical block", "component", and "circuit" may be interchangeably used. A module may be a minimum unit or part of an integrally configured component. A module may be a minimum unit performing at least one function or part thereof. A module may be implemented mechanically or electronically. For example, a module may include at least one of an application-specific integrated circuit (ASIC) chip performing certain operations, field-programmable gate arrays (FPGAs), or a programmable-logic device, all of which are known or are to be developed in the future.

According to an embodiment of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-described components, may not include some of the above-described components, or may further include another component. Operations performed by a module, a programming module, or other components, according to various embodiments of the present disclosure, may be executed through a sequential, parallel, repetitive, or heuristic method. Additionally, some operations may be executed in a different order or may be omitted, or other operations may be added.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
    an audio data processing module configured to:
        generate a storage space where decoded audio data is stored,
        store a plurality of dummy frames in the storage space, the stored plurality of dummy frames having a playable unit length that corresponds to a full length that is formed when encoded audio data is decoded, and
        upon detecting a request for playback of audio data at a requested playback point, decode the encoded audio data from the requested playback point and store the decoded audio data from a position of a dummy frame among the plurality of dummy frames in the storage space, the position corresponding to the requested playback point; and an output device configured to output the decoded audio data.

2. The electronic device of claim 1, wherein the audio data processing module is further configured to generate a file in a memory as the storage space or generate a buffer corresponding to the full length that is formed when the encoded audio data is decoded.

3. The electronic device of claim 1, wherein the audio data processing module is further configured to detect the requested playback point of the encoded audio data based on a length of the dummy frames.

4. The electronic device of claim 1, wherein, while decoding the encoded audio data from the requested playback point or when a predetermined time elapses, the audio data processing module is further configured to decode from a start point of the encoded audio data and store a decoding result at a corresponding point of the storage space.

5. The electronic device of claim 1, wherein, when a change of a playback point of the encoded audio data is requested, the audio data processing module is further configured to decode from a point of the encoded audio data corresponding to a changed playback point, store a decoding result at a corresponding point of the storage space, and output the stored decoding result.

6. The electronic device of claim 1, wherein the audio data processing module is further configured to store, as preview data, un-encoded audio data corresponding to at least one of a predetermined range that is temporally before a point where playback of the audio data is stopped, a predetermined range that is temporally after the point where the playback of the audio data is stopped, and a predetermined range including a reference point.

7. The electronic device of claim 6, wherein, when a request is received for replaying the audio data from the point where the playback of the audio data is stopped, the audio data processing module is further configured to output the preview data.

8. The electronic device of claim 1, wherein the audio data processing module is further configured to collect, as prefetch data, un-encoded audio data corresponding to a predetermined range from a start point of the audio data provided from a specific server device.

9. The electronic device of claim 8, wherein the audio data processing module is further configured to output the prefetch data based on a designation of the audio data, and, when the prefetch data is outputted longer than a specified time, collect at least a part of the audio data from the specific server device.

10. The electronic device of claim 9, wherein, when a specified event occurs in a state where the at least a part of the audio data is greater than a specified size, the audio data processing module is further configured to convert the at least a part of the audio data into the encoded audio data.

11. An audio data operating method of an electronic device, the method comprising:

generating a storage space where decoded audio data is stored;

storing a plurality of dummy frames in the storage space, the stored plurality of dummy frames having a playable unit length that corresponds to a full length that is formed when encoded audio data is decoded;

decoding the encoded audio data from a requested playback point and storing the decoded audio data from a position of a dummy frame among the plurality of dummy frames in the storage space, upon detecting a request for playback of audio data at the requested playback point, the position corresponding to the requested playback point; and outputting the decoded audio data.

12. The method of claim 11, further comprising generating a file in a memory as the storage space or generating a buffer corresponding to the full length that is formed when the encoded audio data is decoded.

13. The method of claim 11, further comprising detecting the requested playback point of the encoded audio data based on a length of the dummy frames.

14. The method of claim 11, further comprising, while decoding the encoded audio data from the requested playback point or when a predetermined time elapses, decoding from a start point of the encoded audio data and storing a decoding result at a corresponding point of the storage space.

15. The method of claim 11, further comprising, when a change of a playback point of the encoded audio data is requested, performing decoding from a point of the encoded audio data corresponding to a changed playback point, storing a decoding result at a corresponding point of the storage space, and outputting the stored decoding result.

16. The method of claim 11, further comprising storing, as preview data, un-encoded audio data corresponding to at least one of a predetermined range that is temporally before a point where playback of the audio data is stopped, a predetermined range that is temporally after the point where the playback of the audio data is stopped, and a predetermined range including a reference point.

17. The method of claim 16, further comprising, when a request is received for replaying the audio data from the point where the playback of the audio data is stopped, outputting the preview data.

18. The method of claim 11, further comprising collecting, as prefetch data, un-encoded audio data corresponding to a predetermined range from a start point of the audio data provided from a specific server device.

19. The method of claim 18, further comprising:

outputting the prefetch data based on a designation of the audio data;

when the prefetch data is outputted longer than a specified time, collecting at least a part of the audio data from the specific server device; and when a specified event occurs in a state where the at least a part of the audio data is greater than a specified size, converting the at least a part of the audio data into the encoded audio data.

20. A non-transitory computer readable medium with computer executable instructions stored thereon executed by a processor to perform an audio data operating method of an electronic device, the method comprising:

generating a storage space where decoded audio data is stored;

storing a plurality of dummy frames in the storage space, the stored plurality of dummy frames having a playable unit length that corresponds to a full length that is formed when encoded audio data is decoded;

decoding the encoded audio data from a requested playback point and storing the decoded audio data from a position of a dummy frame among the plurality of dummy frames in the storage space, upon detecting a request for playback of audio data at the requested playback point, the position corresponding to the requested playback point; and outputting the decoded audio data.

* * * * *